Oct. 27, 1942.  J. V. DAVIS  2,299,965
APPARATUS FOR HANDLING ARTICLES IN BULK
Filed April 15, 1940  2 Sheets-Sheet 1
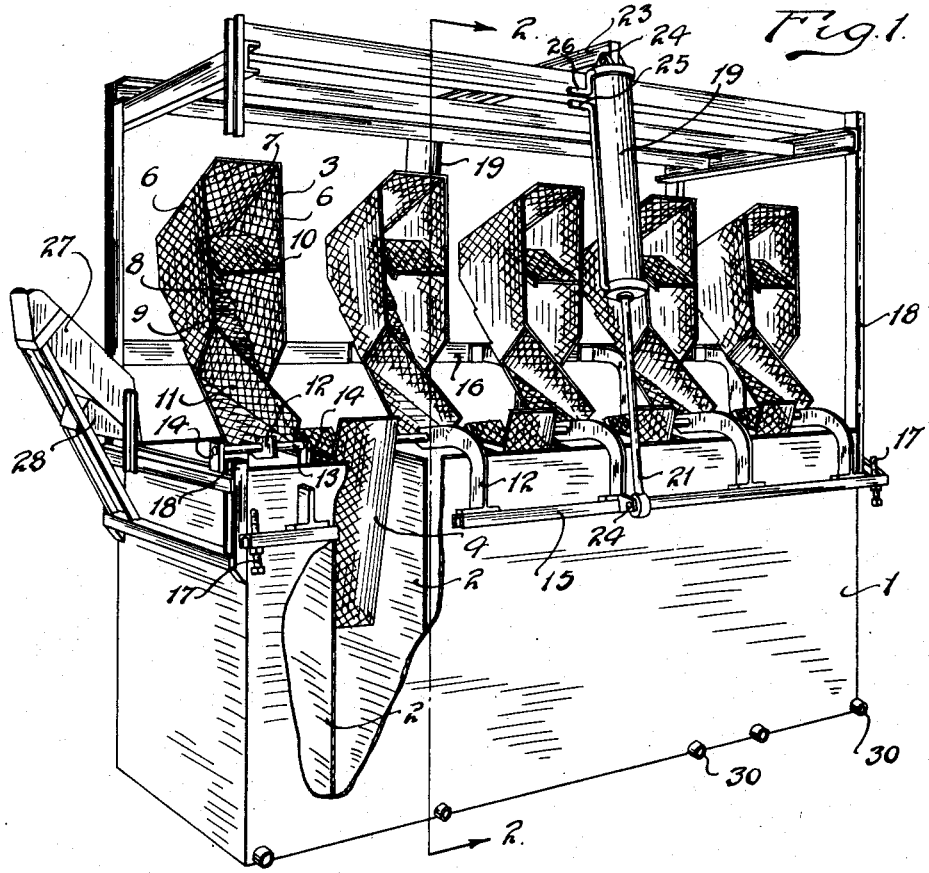
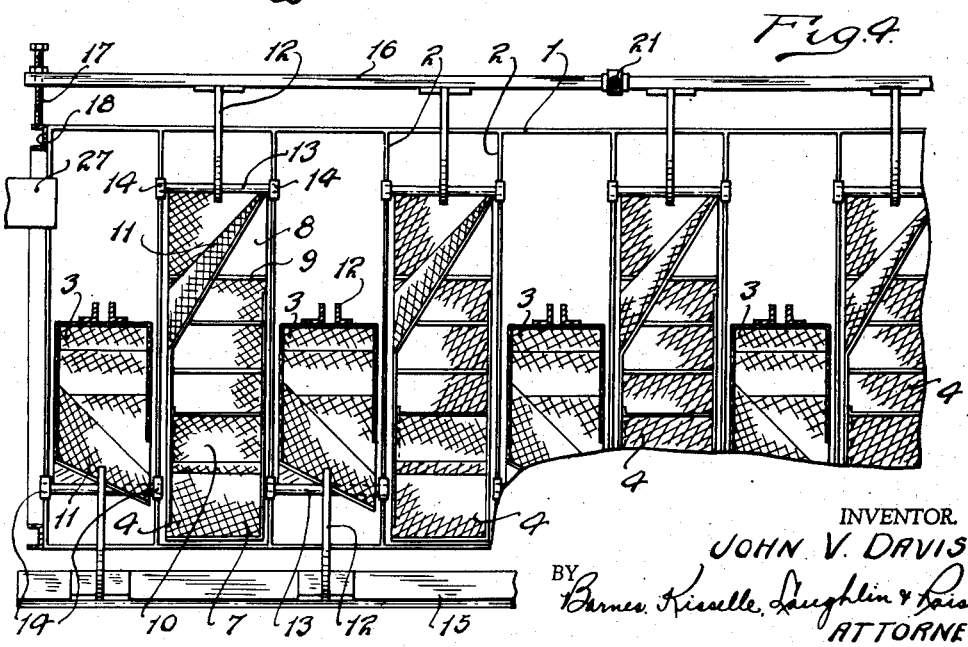
INVENTOR.
JOHN V. DAVIS.
BY
ATTORNEYS.

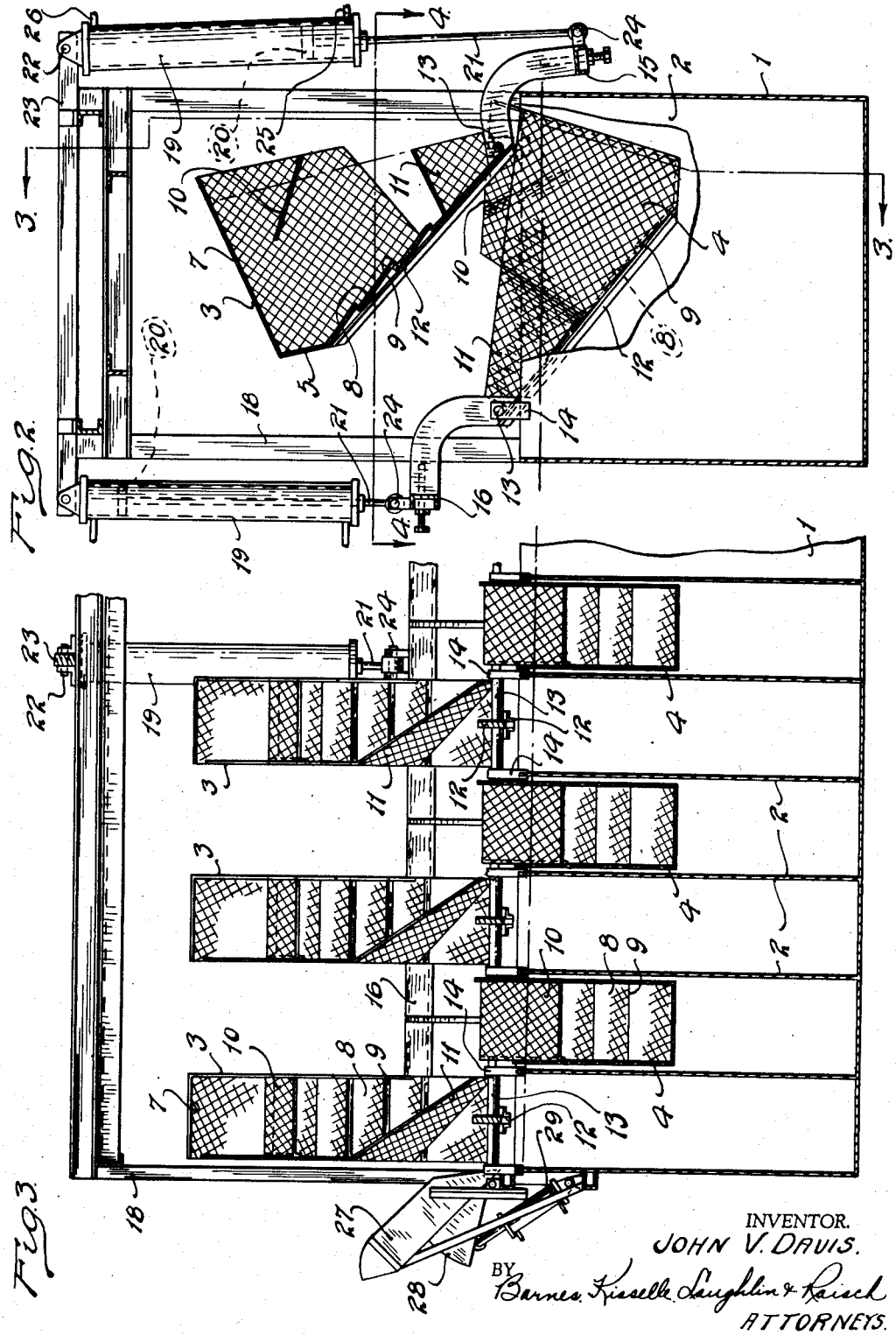

Patented Oct. 27, 1942

2,299,965

UNITED STATES PATENT OFFICE 2,299,965

APPARATUS FOR HANDLING ARTICLES IN BULK

John Virden Davis, Detroit, Mich., assignor to The Udylite Corporation, Detroit, Mich., a corporation of Delaware Application April 15, 1940, Serial No. 329,835

10 Claims. (Cl. 214—17)

This invention relates to an apparatus for handling articles in bulk. In particular the invention concerns an apparatus designed for immersion treatment of articles in bulk where the articles are given a series of immersion treatments.

One of the objects of this invention is to produce an apparatus of this type which is very compact so that it requires a minimum of floor space and which relative to its size gives the work a much longer distance of travel and effects greater tumbling of the work than other apparatus of similar size. This object is achieved by utilizing a plurality of combined work containers and work transfers which are tiltably mounted in juxtaposition so that upon removal of the work from one container it is automatically transferred to the adjacent container.

This invention also contemplates an apparatus which is of simple structure, efficient in operation and which is adapted for numerous uses such as immersion treatment of articles in bulk, drying of articles in bulk and grading of articles according to size.

In the drawings:

Fig. 1 is a perspective view showing one set of work containers lowered for immersion treatment of articles in bulk and the other set of containers raised in work transferring position.

Fig. 2 is a section along the line 2—2 of Fig. 1.

Fig. 3 is a section along the line 3—3 of Fig. 2.

Fig. 4 is a section along the line 4—4 of Fig. 2.

Referring more particularly to the drawings there is shown a tank 1 provided with a plurality of partitions 2 which in effect divides the tank into a plurality of compartments or tanks for receiving different liquids or chemical solutions depending upon the nature of the treatment which is to be given the articles in bulk.

The tank is provided with two sets of work containers. The containers of the one set are referenced 3 and of the other set 4. The containers 3 and 4 are identical in construction, except that one is right hand and the other is left hand, so a description of one will apply equally to the other. Each container comprises a bottom wall 5, vertical side walls 6, an inclined end wall 7 and an inclined end wall 8 which also serves as a bottom wall. The inclined wall 8 is provided with a plurality of steps 9 so that the work is tumbled as it leaves the container. Each container is also provided with a baffle 10 which cooperates with the end wall 7 and the side walls to form a spout through which the work enters the container. The ends of the vertical side walls 6 determine a discharge opening or outlet opposite the end wall 7. Each container is also provided with a baffle 11 which extends at an angle across the bottom wall 8 beyond side walls 6 to deflect the work from one container into the adjacent container. The walls of the containers and the baffles are perforated and may be made from any suitable material such as metal, hard rubber, rubber coated metal, or plastics depending upon the nature of the solution in which the work is immersed. Each container is fixed upon a support in the form of a lever 12 fixed upon shaft 13. Each shaft 13 is journalled in supports 14 mounted on the partitions 2.

The upper ends of the levers 12, upon which the containers 3 are mounted, are fixed to a cross bar 15 and the upper ends of the levers 12 upon which the containers 4 are mounted are fixed to a cross bar 16. Referring to Fig. 2 it will be noted that the work containers 3 are pivoted along the right hand side of the tank 1 and that the work containers 4 are pivoted along the left hand side of the tank 1. Thus upon raising, containers 3 swing clockwise whereas containers 4 swing counterclockwise. It should also be noted that the containers 3 and 4 are arranged alternately within the tank 1.

Each of the cross bars 15 and 16 is provided at each end with stops 17 in the form of bolts which abut against the upright frame members 18 when the containers are lowered. Each set of containers is arranged to be raised and lowered in unison. By way of illustration there is shown for this purpose a compressed air motor comprising cylinder 19, piston 20 and connecting rod 21. The cylinder 19 is pivotally supported as at 22 on the upper frame member 23. Connecting rod 21 is pivotally connected to the cross bar 15 as at 24. Compressed air is admitted into the cylinder beneath the piston by air line 25 and is admitted into the cylinder above the piston by air line 26. Air lines 25 and 26 are connected to a source of compressed air through a suitable valve (not shown) which exhausts air line 26 to atmosphere when compressed air is being admitted into the cylinder through line 25 and vice versa in a well-known manner.

Since the apparatus here shown is designed to transfer the work from left to right, as viewed in Fig. 1, the work is necessarily loaded into the first work container 3 at the left hand end of the tank 1. For this purpose there is shown an inclined chute 27 provided with a valve 28 operated by a compressed air motor 29.

The operation of the apparatus is as follows: At the start of the operation containers 3 will be lowered and preferably, although not necessarily, containers 4 also will be lowered. The work in the form of articles in bulk, such, for example, as nuts, bolts, screws, or the like, will slide down chute 27 into the first container 3 where the work will be given an immersion treatment in the solution contained in the first compartment. After the work has been immersed for the desired time in the first compartment it is now ready to be transferred from work container 3 to the next adjacent work container 4. The work containers 4, of course, must at this time be lowered. The transfer is effected by exhausting the compressed air from the cylinder 19, right hand side of Fig. 2, below the piston 20 permitting the compressed air above the piston to move the piston downwardly in the cylinder. The piston acts through connecting rod 21, cross bar 15 and levers 12 to swing work containers 3 upwardly in a clockwise direction, Fig. 2. As the work container 3 rises the work slides and tumbles down the stepped wall 9 where it strikes the baffle 11 which deflects the work to the right, Figs. 1 and 3, toward the adjacent work container 4. As the work slides by gravity to the right, it enters the container 4 through the spout provided by the side walls of the container, baffle 10 and end wall 7. The work containers 3 are now lowered by admitting air through the air cylinder below the piston while air above the piston is exhausted.

After the work is subjected to the solution in the second compartment from the left, Fig. 1, it is then transferred to the next work container 3 on the right, Fig. 1, by raising the work containers 4 in the manner described above for raising work containers 3. Thus the work starting out in the left hand container 3, by alternately raising containers 3 while containers 4 are lowered and raising containers 4 while containers 3 are lowered, is transferred from one container to another and through the various baths in the compartments within the tank until the work is finally ejected from the last container at the right hand end of the tank 1, Fig. 1.

If it is desired to dry the work at the end or between immersion treatments, this can be accomplished by leaving one of the compartments between the partitions 2 dry so that the work container when positioned with the work in the dry compartment will act as a draining and drying rack. Each of the compartments is provided with a valve controlled drain or outlet 30. If it is desired to agitate the work while it is drying, the container can be quickly raised and lowered through a small distance by means of the air motor 19 which will agitate or shake the work. One may introduce an air blast, hot or cold as desired, to facilitate the drying.

It is evident that the above apparatus provides a very convenient arrangement for alternately raising and lowering every other container of a plurality of containers. It should also be noted that the work does not travel in a straight line directly from one end of the tank 1 to the other but travels a much longer route, to wit; as each container tilts, the work travels crosswise of the tank 1 until it strikes the baffle 11 which causes the work to move diagonally lengthwise of the tank and into the next container. This next container upon tilting causes the work to travel laterally or crosswise in the opposite direction of the tank until it strikes the next baffle 11 whereupon the work again travels diagonally lengthwise of the tank into the next basket and the cycle is repeated from container to container until the work is discharged from the end container.

I claim:

1. A material handling device comprising in combination a plurality of tiltable containers for said material selectively tiltable about parallel axes and said containers being juxtaposed in a direction parallel to the axes of tilt so that each container can be selectively tilted above the next adjacent container whereby the material is discharged by gravity from said tilted container, and means for deflecting the material as it is being discharged from the said tilted container out of its direction of travel into the next adjacent container.

2. A material handling device comprising in combination a plurality of containers for the said material tiltable about axes and juxtaposed in a direction parallel to the axes of tilt, each container comprising side and end walls and provided with an outlet, the said containers being selectively tiltable about parallel axes so that each container can be selectively tilted above the next adjacent container whereby the work is discharged by gravity from the said tilted container through said outlet, and a baffle carried by each container adjacent the outlet for deflecting the material as it is being discharged from a container when tilted diagonally into the next adjacent container.

3. A material handling device comprising in combination a plurality of containers oppositely tiltable about axes and juxtaposed in a direction parallel to the axes of tilt and selectively tiltable so that each container can be selectively tilted above the next adjacent container whereby the material is discharged by gravity from the said tilted container, and means for deflecting the material into the said adjacent container while it is in lowered position.

4. A material handling device comprising in combination a plurality of parallel containers a pivotal support for one end of each of some of the containers and a pivotal support for the other end of each of the other containers whereby the said containers swing upwardly in opposite directions, said containers being juxtaposed in a direction parallel to the pivotal supports and each container having a material outlet and a material inlet, the inlet of each container being positioned adjacent the outlet of the next adjacent container whereby when a container is swung upwardly the material is discharged by gravity from the outlet of the said container into the inlet of the next adjacent container while in lowered position whereby the material travels from side to side of the device as it is transferred by the containers.

5. A material handling device comprising in combination a plurality of aligned compartments adapted to receive liquids, a plurality of tiltable containers adapted to be lowered into and raised from the said compartments, the container for each compartment being mounted to tilt in the opposite direction from the container in the next adjacent compartment, all of said containers being tiltable in planes at an angle to the direction of alignment of the compartments the containers being selectively tiltable so that each container can be tilted above the next adjacent container so that the material in the tilted container is discharged by gravity, and means for deflecting the material from the thus raised container into the adjacent lowered container whereby the said raised container serves both as a container for the material while immersed in the liquid for treatment and as a transfer for transferring the material to the next adjacent container and whereby the material travels from side to side of the device as it is transferred by the containers.

6. A material handling device comprising in combination a tank divided into a plurality of compartments each adapted to receive a liquid for treating the material in bulk, a plurality of containers, pivotal support means for pivotally supporting the containers in the compartments alternately adjacent opposite sides of the tank whereby adjacent containers swing in opposite directions in raising and lowering of the same, each container having an outlet adjacent an inlet in the adjacent container, an angular baffle extending across the outlet of each container whereby when the container is pivoted upwardly the material is discharged by gravity from the said raised container and deflected by the said baffle through the inlet in the next adjacent container.

7. A material handling device comprising in combination a plurality of aligned tanks each adapted to receive a liquid, a plurality of material containers for said tanks oppositely tiltable about axes parallel with the aligned tanks, said containers each comprising side, bottom and end walls and having a portion of its wall foraminated, each container having an outlet at its lower end when raised upwardly and a plurality of steps in its lower wall portion for tumbling the material as it is discharged by gravity from the raised container, and means for deflecting the material as thus discharged into the other container while in lowered position whereby the material travels in a tortuous path as it is transferred by the containers.

8. A material handling device comprising in combination a tank divided into a plurality of compartments each adapted to receive a liquid for immersion treatment of said material in bulk, a set of spaced containers pivotally supported along one side of the tank and another set of spaced containers mounted between the aforesaid containers and pivotally supported along the opposite side of the tank, each container having an outlet positioned adjacent the inlet of the adjacent container and a wall inclined downwardly and outwardly from the pivot when the container is lowered into the tank, a baffle extending angularly across the outlet of each container toward the inlet of the adjacent container whereby when the one set of containers is swung upwardly the material is discharged by gravity from said containers and deflected into the adjacent containers of the other set while in lowered position.

9. A material handling device comprising in combination a plurality of tiltable containers for said material tiltable about parallel axes, said containers being positioned in spaced relation along and parallel to the axes of tilt so that each container can be tilted above the next axially spaced container whereby the material is discharged by gravity from said tilted container, and means for deflecting the material as it is being discharged from the said tilted container out of its direction of travel into the next axially spaced container.

10 A material handling device comprising in combination two series of tiltable containers for said material tiltable about parallel axes, said containers in each series being aligned in a row parallel to the axes of tilt so that each series of containers can be tilted above the other series of containers whereby the material is discharged by gravity from the series of tilted containers, and means for causing the material in the elevated series of containers to pass into the next adjacent containers of the lowered series of containers.

JOHN VIRDEN DAVIS.